US009834406B2

(12) United States Patent
Mezzadri et al.

(10) Patent No.: US 9,834,406 B2
(45) Date of Patent: Dec. 5, 2017

(54) ELEVATOR SYSTEM INCLUDING A POWER STORAGE DEVICE WITH A SUPERCAPACITOR UNIT AND A BATTERY UNIT

(75) Inventors: Carlo Mezzadri, Milan (IT); Glanluca Foschini, Ravenna (IT); Carlo Colombari, Sala Bolognese (IT)

(73) Assignee: Otis Elevator Company, Farmington, CT (US)

( * ) Notice: Subject to any disclaimer, the term of this patent is extended or adjusted under 35 U.S.C. 154(b) by 442 days.

(21) Appl. No.: 14/401,361

(22) PCT Filed: Jun. 1, 2012

(86) PCT No.: PCT/IT2012/000167
§ 371 (c)(1),
(2), (4) Date: Nov. 14, 2014

(87) PCT Pub. No.: WO2013/179324
PCT Pub. Date: Dec. 5, 2013

(65) Prior Publication Data
US 2015/0122589 A1   May 7, 2015

(51) Int. Cl.
*B66B 1/08*   (2006.01)
*B66B 1/30*   (2006.01)
*B66B 19/00*   (2006.01)

(52) U.S. Cl.
CPC .............. *B66B 1/306* (2013.01); *B66B 1/302* (2013.01); *B66B 19/007* (2013.01); *Y02B 50/142* (2013.01)

(58) Field of Classification Search
CPC ....... B66B 1/306; B66B 1/302; B66B 19/007; Y02B 50/142
(Continued)

(56) References Cited

U.S. PATENT DOCUMENTS 5,896,948 A  *  4/1999  Suur-Askola ............. B66B 1/30
                                                    187/290
6,471,013 B2    10/2002  Banno et al.
(Continued)

FOREIGN PATENT DOCUMENTS

| CN | 1845417 | 10/2006 |
|---|---|---|
| EP | 2336068 | 6/2011 |
| WO | 9825849 | 6/1998 |

OTHER PUBLICATIONS

Office action for CN 201280073419.9 dated Oct. 26, 2015.

*Primary Examiner* — Anthony Salata
(74) *Attorney, Agent, or Firm* — O'Shea Getz P.C.

(57) ABSTRACT

An elevator system is provided that includes an elevator car, a counterweight, a load bearing flexible member, a motor having a drive, and an elevator control system. The car and counterweight are operable to be translated within a hoistway. The load bearing flexible member extends between the elevator car and the counterweight. The motor is operable to move the load bearing member and thereby drive the elevator car and counterweight within the hoistway. The elevator motor and drive are configured to selectively produce regenerative power. The elevator control system includes a power manager unit and a power storage device. The power storage device includes a supercapacitor unit and a battery unit. The power manager unit is operable to selectively manage the flow of power between the power storage device and the motor drive, and the flow of regenerative power from the motor drive to the power storage device.

21 Claims, 3 Drawing Sheets

(58) Field of Classification Search
USPC ....... 187/247, 277, 290, 293, 391, 393, 296, 187/297; 307/66, 68
See application file for complete search history.

(56) References Cited

U.S. PATENT DOCUMENTS

| | | | |
|---|---|---|---|
| 6,522,099 B2* | 2/2003 | Tominaga | B66B 1/30 187/290 |
| 6,742,630 B2 | 6/2004 | Eilinger | |
| 6,938,733 B2 | 9/2005 | Eilinger | |
| 7,246,686 B2 | 7/2007 | Smith et al. | |
| 7,331,426 B2 | 2/2008 | Jahkonen | |
| 7,554,278 B2* | 6/2009 | Wegner-Donnelly | B66C 13/18 187/277 |
| 7,681,694 B2 | 3/2010 | Aulanko et al. | |
| 8,083,033 B2* | 12/2011 | Kallioniemi | B66B 1/2458 187/290 |
| 8,096,387 B2 | 1/2012 | Kattainen et al. | |
| 8,138,720 B2* | 3/2012 | Snyder | B60K 6/28 307/44 |
| 8,172,042 B2* | 5/2012 | Wesson | B66B 1/302 187/290 |
| 8,230,978 B2* | 7/2012 | Agirman | B66B 1/302 187/290 |
| 8,590,672 B2* | 11/2013 | Oggianu | B66B 1/302 187/290 |
| 8,616,338 B2* | 12/2013 | Veronesi | B66B 1/302 187/290 |
| 8,622,177 B2* | 1/2014 | Acquaviva | B66B 1/302 187/285 |
| 8,714,313 B2* | 5/2014 | Harkonen | B66B 1/302 187/289 |
| 9,422,141 B2* | 8/2016 | Foley | B66F 7/0625 |
| 2003/0089556 A1 | 5/2003 | Eilinger | |
| 2009/0014252 A1 | 1/2009 | Vedula et al. | |
| 2009/0302788 A1 | 12/2009 | Mitsuda et al. | |
| 2015/0203328 A1* | 7/2015 | Horbrugger | B66B 1/302 187/290 |
| 2016/0083220 A1* | 3/2016 | Agirman | H02J 7/02 187/290 |

\* cited by examiner

ELEVATOR SYSTEM INCLUDING A POWER STORAGE DEVICE WITH A SUPERCAPACITOR UNIT AND A BATTERY UNIT

This application is entitled to the benefit of, and incorporates by reference essential subject matter disclosed in PCT Application No. PCT/IT2012/000167 filed on Jun. 1, 2012.

BACKGROUND OF THE INVENTION

Technical Field

The present invention relates to the supply of electrical power to an elevator system in general, and to devices capable of storing electrical power for an elevator in particular.

Background Information

In some applications, according to the local energy market and grid power quality, it is desirable to equip a grid-powered elevator with an energy accumulation device that can be accessed during peak power demand periods or periods when grid power is not available (i.e., blackout mode).

This accumulation device can be also used, to regeneratively recover energy when the elevator is operating in a braking phase in order to achieve a better performance in terms of energy efficiency, and also greater duration when operating in blackout mode.

Lead acid batteries are sometimes used as a reserve power source in elevators due to the relative low cost of a battery pack that can cover the energy demand of the entire elevator system for more than one day.

Unfortunately, lead acid batteries typically have a relatively short service life, and are inefficient at regeneratively recovering high power peaks that are available when an elevator is operating in a braking phase. These two factors make it difficult to take advantage of power regenerated by an elevator system.

Using other kinds of chemical batteries (e.g., ion lithium, nickel cadmium, etc.), could improve battery life and efficiency. These types of batteries can however, be prohibitively expensive when configured to cover significant periods of blackout mode operation in a low rise residential application. In addition, in many countries there are compulsory safety measures related to implementation of high energy density batteries for transportation and storage.

Unfortunately, the current battery market does not offer a single device that can store sufficient energy to cover all the requirements discussed above, at a price that is competitive in the low rise residential market.

What is needed is an elevator system with a drive system with the capability to cover peak power demands of an elevator running with very low power demand from a grid, with excellent regenerative features (like grid regenerative drive efficiency), which system can be used during grid power outages (e.g., blackouts lasting from a few seconds to more than one day) to cover, for example, specific customer needs in terms of outage duration based on local power grid quality, and which system has the reliability of an elevator normally operating under full grid power.

SUMMARY OF THE INVENTION

According to an aspect of the present invention, an elevator system is provided. The elevator system includes an elevator car, a counterweight, a load bearing flexible member, a motor having a drive, and an elevator control system. The car and counterweight are operable to be translated within a hoistway. The load bearing flexible member extends between the elevator car and the counterweight. The motor is operable to move the load bearing member and thereby drive the elevator car and counterweight within the hoistway. The elevator motor and drive are configured to selectively produce regenerative power. The elevator control system includes a power manager unit and a power storage device. The power storage device includes a supercapacitor unit and a battery unit. The power manager unit is operable to selectively manage the flow of power between the power storage device and the motor drive, and the flow of regenerative power from the motor drive to the power storage device.

According to another aspect of the present invention, a control system for an elevator system is provided. The elevator system includes an elevator car and counterweight operable to be translated within a hoistway, a load bearing flexible member extending between the elevator car and counterweight, and a motor having a drive. The elevator motor and drive are configured to selectively produce regenerative power. The control system includes a power storage device and a power manager unit. The power storage device includes a supercapacitor unit and a battery unit. The power manager unit is operable to selectively manage the flow of power between the power storage device and the motor drive, and the flow of regenerative power from the motor drive to the power storage device.

The present elevator system can be implemented in a "new equipment" form or in a modernization/retrofit form. In the new equipment form, the elevator system is specifically designed for and implemented in a new building. In the modernization/retrofit form, an existing elevator system is modified according to the present invention, or the present elevator system is utilized in an existing building, respectively. In any of these embodiments, the present invention system can add valuable new features like blackout mode operation, and offer significant energy savings at a competitive cost and with short installation time.

DETAILED DESCRIPTION OF THE INVENTION

Figure 1:
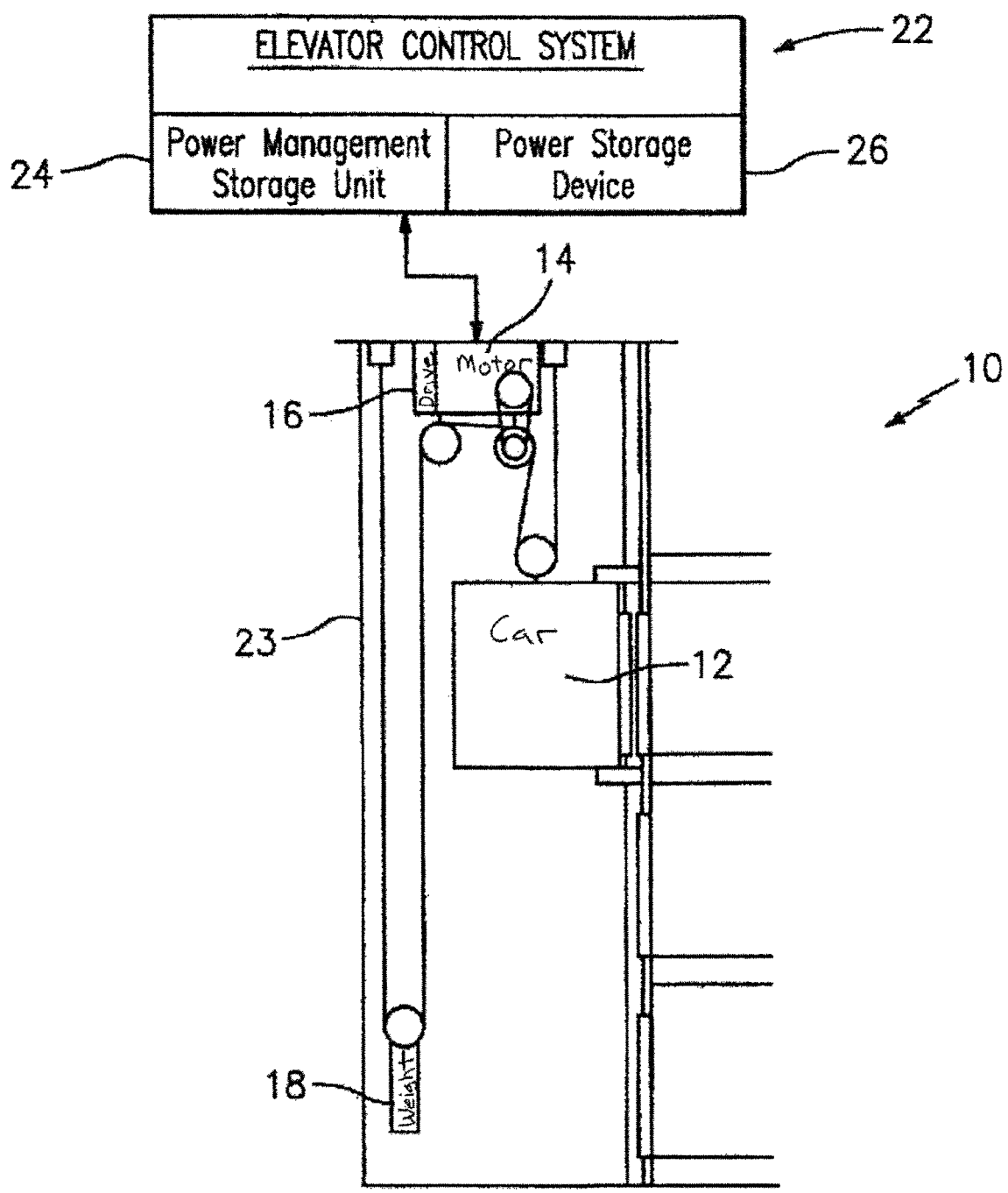
FIG. 1 is a diagrammatic view of an elevator system.

Referring to FIG. 1, an elevator system 10 is schematically shown that includes an elevator car 12, an elevator motor 14 and drive 16, a counterweight 18, and an elevator control system 22, for operation within a hoistway 23. The control system 22 includes circuitry operable to provide electrical power to electrical components within the elevator system 10, and includes a power manager unit 24, and a power storage device 26. In some embodiments, the elevator control system 22 also includes hardware 28 (see FIG. 2) for connecting to one or more alternative power sources 30.

Figure 2:
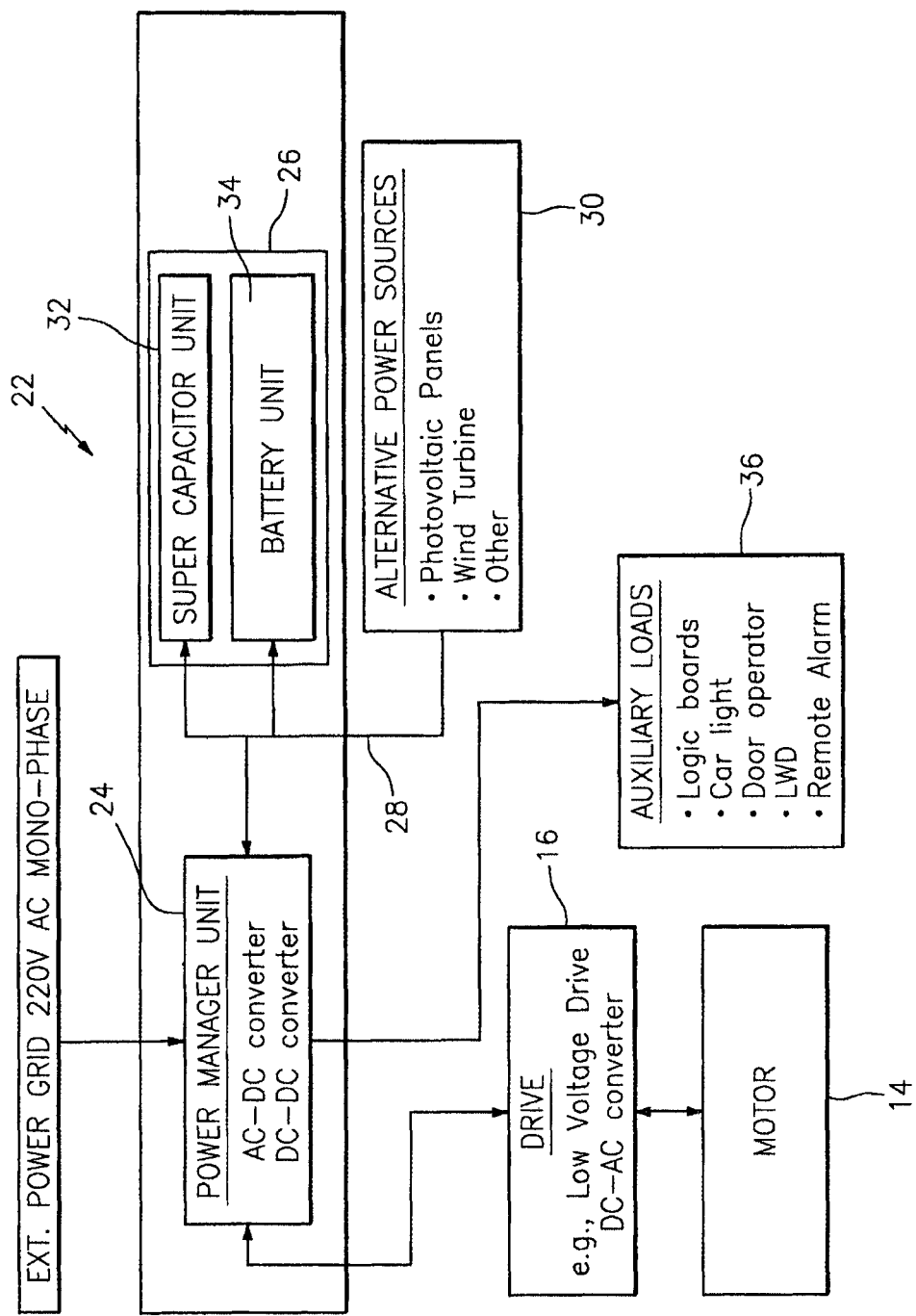
FIG. 2 is a block diagram of a new equipment embodiment of the present elevator control system, including a power storage device and a power manager unit.
Figure 3:
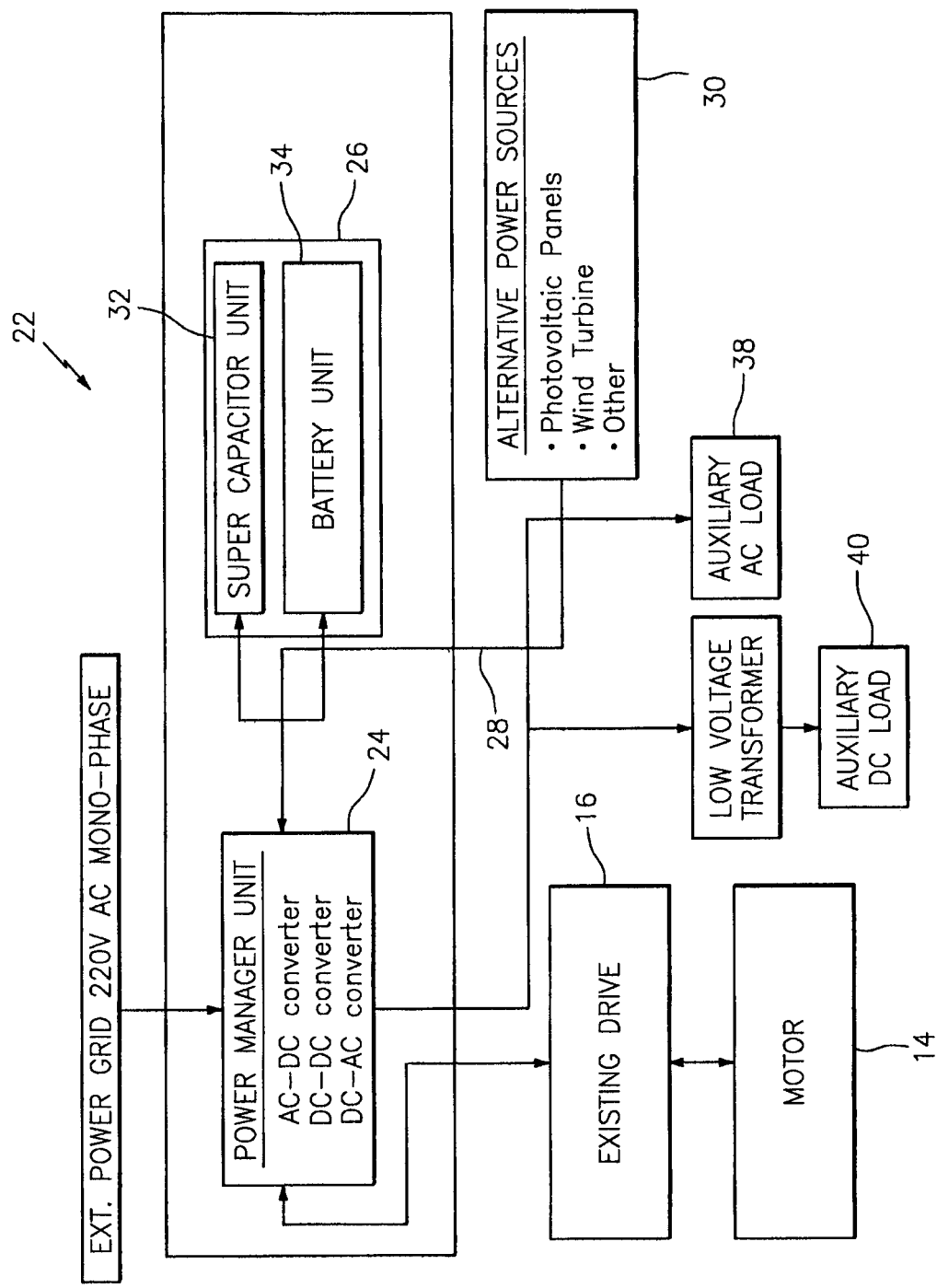
FIG. 3 is a block diagram of a modernization/retrofit embodiment of the present elevator system, including a power storage device and a power manager unit.

Referring to FIGS. FIGS. 1-3, the elevator motor 14 and drive 16 are configured to selectively produce regenerative power, for example, during a braking mode as is known in the art. In most elevator systems, the counterweight 18 is given a weight that is approximately equal to the weight of the elevator car 12 with a moderate load (e.g., half the rated load). Consequently, when a less than moderately loaded elevator car 12 is moved downward in the hoistway, the elevator system 10 must do work to drive the heavier counterweight 18 upwards. Similarly, when a heavily loaded elevator car 12 is moved upward within the hoistway, the elevator system 10 must do work to drive the heavier elevator car 12 upwards. In a regenerative mode, however, potential energy (e.g., when a heavily loaded car is located vertically above the counterweight 18, or when a heavier counterweight 18 is located above an empty car) available from work previously performed can be converted into electric power by using the motor 14 and drive 16 in a regenerative manner. In the present invention, the power manager unit 24 includes a circuitry operable to transfer power to the power storage device 26 from the motor 14 and drive 16 when regenerative energy provides an excess of power relative to then-current power demands. The circuitry is also operable to retrieve power from the power storage device 26, which can manage (e.g., limit) the power demand from the external power grid, and/or allow for normal elevator service in case of external power outage.

The power storage device 26 includes a supercapacitor unit 32 and a battery unit 34. The supercapacitor unit 32 includes a plurality of individual supercapacitors which may be connected in series and/or in parallel with one another. An example of an acceptable type of supercapacitor is an electric double layer type capacitor ("EDLC"). In particular, a plurality of EDLCs combined in series and/or in parallel can collectively provide a capacitive energy source with a voltage rating that is acceptable for use in an elevator system 10. The battery unit 34 may include a single battery, or a plurality of batteries; e.g., connected to one another in series and/or in parallel. Examples of acceptable battery types include valve-regulated lead acid type batteries, hybrid chemical batteries, Li-ion batteries, etc.

The present elevator system 10 is not limited to any particular type of battery. The power storage device 26 is configured within the elevator control system 22 in a manner that permits one or both of the supercapacitor unit 32 and a battery unit 34 to be charged/recharged using regenerative power and/or grid power as will be explained below.

The power storage device 26 is not limited to any particular configuration of the supercapacitor unit 32 and the battery unit 34. For example, the power storage device 26 may be configured so that the supercapacitor unit 32 is discharged before the battery unit 34, or vice versa. The power storage device 26 may also be configured so that the supercapacitor unit 32 is recharged before the battery unit 34, or vice versa. Supercapacitors, and in particular EDLCs, have a much higher power density than most conventional batteries (e.g., 10 to 100 times greater power density), but also have a relatively low energy density relative to conventional batteries (e.g., 1/10 of the energy density). Conventional batteries (e.g., lead-acid batteries) have relatively slow charge and discharge times.

Supercapacitors, on the other hand, can be charged or discharged at a very fast rate relative to a conventional battery. The power storage device 26 is configured to take advantage of the aforesaid characteristics of the supercapacitor unit 32 and the battery unit 34. As a result, the present power storage device 26 can provide adequate power to supplement grid power, or solely provide power when grid power and auxiliary power are not available (e.g., during a blackout mode), with batteries typically smaller in size than would be required in a conventional battery unit 34 for an elevator. Batteries in a conventional battery unit for an elevator, for example, are typically oversized to reduce charge and/or discharge rates in order to compensate for their relatively poor efficiency and/or relatively high rate of battery life degradation.

In the block diagram of FIG. 2, a new equipment embodiment of the present elevator system 10 is shown. The elevator system 10 includes an elevator control system 22 that has a power manager unit 24 adapted to manage the flow of power between different power sources. The power sources include grid power, regenerative power, the power storage device 26, and can include generated power sources 30 that are alternatives to grid power; e.g., power produced from photovoltaic panels, wind turbines.

In some embodiments, the power manager unit 24 includes an electronic multi-step switching converter. The unit 24 may include an AC-DC switching capability that permits manager of power from the external grid to the power storage device 26, the elevator drive 16, and the auxiliary load components (e.g., logic boards, car lights, a door operator, a load weight device "LWD" that determines a load (e.g., weight) in/of the elevator car, a remote alarm, etc.). The power manager unit 24 may also include DC-DC switching capability, including one or more step-up circuits and step-down circuits to feed and retrieve energy from the power storage device 26 (e.g., from the supercapacitors within the power storage device 26). The power manager unit 24, which can adjust in real time the power flow voltage, allows the supercapacitors to be sized such that a substantial amount of their capacity can be utilized, which in turn makes it possible to use smaller, and therefore more cost effective, supercapacitors.

Under normal operation, in the new equipment embodiment the power manager unit 24 receives a mono-phase AC current (e.g., 220V AC mono-phase) coming from an external grid. The power manager unit 24 is operable to selectively manage power flow between, for example:

a) each unit of the storage device 26 and the motor drive 16 (both ways), adjusting the power flow ratio between the supercapacitor 32 and the battery 34 unit (e.g. 90% supercapacitor and 10% battery unit, or 100% supercapacitor and 0% battery unit);

b) one or more units of the power storage device 26 (e.g., between the supercapacitor 32 and the battery 34 unit, both ways);

c) the external power grid and the motor drive 16;

d) the external power grid and each unit of the storage device 26 (e.g. 10% supercapacitor and 90% battery unit, or 0% supercapacitor and 100% battery unit);

e) the alternative power sources 30 and the motor drive 16;

f) the alternative power sources 30 and each unit of the storage device 26 (e.g. 10% supercapacitor and 90% battery unit, or 0% supercapacitor and 100% battery unit); and/or g) the auxiliary elevator loads 36 and each unit of the storage device 26 (e.g. 10% supercapacitor and 90% battery unit, or 0% supercapacitor and 100% battery unit).

In some embodiments where the power source (e.g., power storage device 26 and/or the alternative power sources 30) produces DC power directly, then the power manager unit 24 can be configured to provide DC current to the elevator drive 16 without conversion (e.g., from DC to AC, and vice versa).

In the block diagram of FIG. 3, a modernization (sometimes referred to as a retrofit) embodiment of the present elevator system 10 is shown. In this embodiment, the power manager unit 24 is configured to receive, during normal operation, a mono-phase AC current (e.g., 220V AC monophase) coming from an external grid. In the event that the original elevator drive 16 operated off of multiphase power (e.g., 380V AC three-phase power), that power source can be switched off. The power manager unit 24 in this embodiment is operable to selectively manage power flow between, for example:

a) each unit of the storage device 26 and the motor drive 16 (both ways), adjusting the power flow ratio between the supercapacitor 32 and the battery 34 unit (e.g. 90% supercapacitor and 10% battery unit, or 100% supercapacitor and 0% battery unit);

b) one or more units of the power storage device 26 (e.g. between the supercapacitor 32 and the battery 34 unit, both ways);

c) the external power grid and the motor drive 16;

d) the external power grid and each unit of the storage device 26 (e.g. 10% supercapacitor and 90% battery unit, or 0% supercapacitor and 100% battery unit);

e) the alternative power sources 30 and the motor drive 16;

f) the alternative power sources 30 and each unit of the storage device 26 (e.g. 10% supercapacitor and 90% battery unit, or 0% supercapacitor and 100% battery unit); and/or g) the auxiliary elevator loads 38, 40 and each unit of the storage device 26 (e.g. 10% supercapacitor and 90% battery unit, or 0% supercapacitor and 100% battery unit).

In some embodiments where the power source (e.g., power storage device 26 and/or the alternative power sources 30) produces DC power directly, then the power manager unit 24 can be configured to provide DC current to the elevator drive 16 without conversion (e.g., from DC to AC, and vice versa). When the existing drive 16 includes a rectifier, it may be necessary to bypass the rectifier in view of the converters within the power manager unit 24.

During one or more of the operational modes of elevator system (e.g. running motor mode, running braking mode and stopping standby or idle mode), the power manager unit 24 utilized in the embodiment shown in FIGS. 2 and 3 is configured to passively and/or actively (e.g., in real time) coordinate the relative power contributions from the main grid and from the other power sources; e.g., the supercapacitors and batteries within the power storage device 26, regenerative power, alternative power sources, etc. By properly coordinating the contributions from and/or between the different power sources, the power manager unit 24 can provide several advantages; e.g., the power manager unit 24 can:

a) increase energy efficiency by selecting a relatively more efficient storage device to provide or recover power based on the current operating conditions; e.g., the supercapacitors can be used to cover short term energy needs during an elevator running phase, and batteries can be utilized to cover long term energy needs, such as during blackout mode;

b) increase the duration of the stored power available to the elevator during blackout mode by efficient power flow management; e.g., efficient management of low cost lead acid batteries provides increased duration at a competitive cost due to big capacity of chemical batteries;

c) increase battery life by using a relatively low charging or discharging rate such that battery size and type is configured based on customer requirements in terms of blackout operation, and wherein the low charging and discharging rate can also reduce or prevent wasting power via a braking resistor to mitigate battery health degradation;

d) provide a buffer in terms of the state of charge of the super capacitors, so that the supercapacitors are able to accept regenerative energy produced during elevator braking; e.g., the regenerative energy that would be, produced by braking an elevator car for a full rise, with a maximum amount of load imbalance;

e) provide a buffer in terms of a chemical battery state of charge (10-40% of State of Charge—"SoC") in order to avoid the need to dissipate regenerative energy developed in a braking resistor during elevator braking, and/or to drive battery charging efficiency close to unity ("1") by charging the battery away from the top SoC (e.g., 70% of nominal SoC with a buffer of 30% of nominal SoC);

g) spread the power demand from the external grid within the building during elevator standby phase, and thereby decrease the nominal power demand from the grid—as a result, it is possible to merely use an undersized mono-phase power supply to cut contract fees associated with connection with the external main grid;

h) permit access to power from the main grid to charge the power storage device 26 at certain (e.g., low demand) times of the day, thereby enabling power purchase at reduced rates;

i) manage communication with other elevator systems disposed in a group configuration (duplex , triplex), thereby enabling power source sharing amongst the elevators in order to achieve improved efficiency;

j) allow recovery and/or dumping of power coming from an alternative power source; and/or k) provide power to a bidirectional communication device during emergency blackout mode operation by the supercapacitors in order to avoid having to periodically test the batteries as may be currently required by local codes.

The present modernization embodiment can also include a DC-AC converter for powering existing auxiliary load items; e.g., car lights, door operator, etc.

The invention claimed is:

1. An elevator system, comprising:
an elevator car and a counterweight operable to be translated within a hoistway;
a load bearing flexible member extending between the elevator car and the counterweight;
a motor having a drive, which motor is operable to move the load bearing member and thereby drive the elevator car and counterweight within the hoistway, and wherein the elevator motor and drive are configured to selectively produce regenerative power; and
an elevator control system that includes a power manager unit and a power storage device, wherein the power storage device includes a supercapacitor unit and a battery unit, and wherein the power manager unit is operable to selectively manage a flow of power between the power storage device and the motor drive, and a flow of regenerative power from the motor drive to the power storage device;
wherein the power manager unit is further operable to selectively manage power flow between the supercapacitor unit and the battery unit.

2. The elevator system of claim 1, wherein the power manager unit is configured to receive power from a grid, and selectively manage the elevator system drawing power from one or both of the grid and the power storage device.

3. The elevator system of claim 2, wherein the power manager unit is configured to selectively supply grid power to the power storage device.

4. The elevator system of claim 2, wherein the power manager unit is configured to receive power from a power source alternative to the grid and the power storage device.

5. The elevator system of claim 1, wherein the supercapacitor unit includes a plurality of supercapacitors.

6. The elevator system of claim 5, wherein the supercapacitors are electric double layer type capacitors.

7. The elevator system of claim 1, wherein the battery unit includes one or more lead acid type batteries.

8. The elevator system of claim 1, wherein the power manager unit includes an electronic multi-step switching converter.

9. A control system for an elevator system, which elevator system includes an elevator car and counterweight operable to be translated within a hoistway, a load bearing flexible member extending between the elevator car and counterweight, and a motor having a drive, wherein the elevator motor and drive are configured to selectively produce regenerative power, and the motor is engaged with the load bearing flexible member to move the elevator car and counterweight within the hoistway, the control system comprising:
  a power storage device including a supercapacitor unit and a battery unit; and
  a power manager unit operable to selectively manage a flow of power between the power storage device and the motor drive, and a flow of regenerative power from the motor drive to the power storage device;
  the power manager further operable to selectively manage power flow between the supercapacitor unit and the battery unit.

10. The control system of claim 9, wherein the power manager unit is configured to receive power from a grid, and at least one of actively and passively manage the elevator system drawing power from one or both of the grid and the power storage device.

11. The control system of claim 10, wherein the power manager unit is configured to selectively supply grid power to the power storage device.

12. The control system of claim 10, wherein the power manager unit is configured to receive power from a power source alternative to the grid and the power storage device.

13. The control system of claim 9, wherein the supercapacitor unit includes a plurality of supercapacitors.

14. The control system of claim 13, wherein the supercapacitors are electric double layer type capacitors.

15. The control system of claim 9, wherein the battery unit includes one or more lead acid type batteries.

16. The control system of claim 9, wherein the power manager unit includes an electronic multi-step switching converter.

17. The control system of claim 9, wherein the power manager unit is configured to provide a state of charge buffer to at least one of the super capacitors and the battery, and to receive regenerative energy produced during elevator braking.

18. The control system of claim 9, wherein the power manager unit is adapted to charge the power storage device at predetermined times within a period of time.

19. The control system of claim 9, wherein the power manager unit is configured to provide power to a bidirectional communication device during an emergency blackout mode of operation through the supercapacitors.

20. The control system of claim 9, wherein the power manager unit includes a DC-DC switching unit configured to receive DC current and provide DC current to the elevator drive.

21. The control system of claim 9, wherein the power manager unit is configured to provide power from the power storage device to another elevator system.

* * * * *